United States Patent
Crawshaw et al.

(10) Patent No.: US 6,364,020 B1
(45) Date of Patent: Apr. 2, 2002

(54) EMULSION FOR WELL AND FORMATION TREATMENT

(75) Inventors: John Peter Crawshaw, New Market (GB); Oscar Cornelius Johanna Nijs, Amsterdam (NL)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/424,462

(22) PCT Filed: May 20, 1998

(86) PCT No.: PCT/GB98/01447

§ 371 Date: Mar. 20, 2000

§ 102(e) Date: Mar. 20, 2000

(87) PCT Pub. No.: WO98/53180

PCT Pub. Date: Nov. 26, 1998

(30) Foreign Application Priority Data

May 24, 1997 (GB) .............................. 9710666

(51) Int. Cl.⁷ .......................... E21B 43/16; E21B 33/13
(52) U.S. Cl. ....................... 166/300; 166/295; 166/308; 507/225; 507/937
(58) Field of Search ................. 166/285, 295, 166/300, 308; 507/225, 922, 937; 523/130, 131

(56) References Cited

U.S. PATENT DOCUMENTS

| 4,397,354 A | | 8/1983 | Dawson et al. |
| 4,595,512 A | | 6/1986 | Tellier et al. |
| 4,663,366 A | | 5/1987 | Drake et al. |
| 4,799,549 A | | 1/1989 | Vinot et al. |
| 4,819,723 A | | 4/1989 | Whitfill et al. |
| 4,891,072 A | | 1/1990 | Cooper |
| 4,934,456 A | * | 6/1990 | Moradi-Araghi ............ 166/270 |
| 5,161,615 A | * | 11/1992 | Hutchins et al. ............ 166/295 |

FOREIGN PATENT DOCUMENTS

| GB | 2008651 | | 6/1979 |
| GB | 2022653 | A | 12/1979 |
| WO | 94/28085 | | 12/1994 |
| WO | 96/07710 | | 3/1996 |

\* cited by examiner

*Primary Examiner*—David Bagnell
*Assistant Examiner*—Jennifer R. Dougherty
(74) *Attorney, Agent, or Firm*—Robin C. Nava; Stephen F. Schlather; Thomas O. Mitchell

(57) ABSTRACT

An emulsion with flow-initiated gelling properties is described, comprising at least two discontinuous phases with a polymer and cross-linking agent separated by two phase boundaries. The novel emulsion is preferably used for remedial operations in a subterranean formation or wellbore.

12 Claims, 2 Drawing Sheets

EMULSION FOR WELL AND FORMATION TREATMENT

The present invention relates to fluids which gel following a trigger event for subterranean well and formation treatment.

BACKGROUND OF THE INVENTION

At various stages in the drilling, completion, and operation of natural hydrocarbon reservoirs, gelling compositions are employed. The procedures in which they are used include fracturing subterranean formations, modifying the permeability of subterranean formations and sand control. Other procedures are known as plugging operations. Plugging an oil well is a common operation practised for a variety of reasons, for example, to sidetrack above a fish (equipment lost in the hole), to initiate directional drilling in a weak formation, to plug back a zone or a complete well for abandonment, to cure a lost circulation problem encountered during drilling, or to provide a test anchor when a weak formation exists in an open hole below the zone to be tested.

Many gelling compositions are based on crosslinked polymers. The polymers employed are typically water soluble. Commonly used classes of water soluble polymers include polyvinyl polymers, polyacrylamides, cellulose ethers, or polysaccharides, in particular galactomannans (e.g., guar gum) and derivatives, thereof, or heteropolysaccharides (e.g., xanthan gum).

With respect to crosslinking agents, numerous examples of both, organic and inorganic compounds are known to those skilled in the art. Exemplary inorganic crosslinking agents include typically polyvalent metals, chelated polyvalent metals, and compounds capable of yielding polyvalent metals. Some of the more common inorganic crosslinking agents include chromium salts, iron salts, vanadium salts, aluminates, borates, gallates, titanium chelates, aluminium citrate, chromium citrate, chromium acetate, chromium propionate, and zirconium chelates or complexes.

Exemplary organic crosslinking agents include include aldehydes, dialdehydes, phenols, substituted phenols, and ethers. Phenol, resorcinol, catechol, phloroglucinol, gallic acid, pyrogallol, 4,4'-diphenol, 1,3-dihydroxynaphthalene, 1,4-benzoquinone, hydroquinone, quinhydrone, tannin, phenyl acetate, phenyl benzoate, 1-naphthyl acetate, 2-naphthyl acetate, phenyl chloroacetate, hydroxyphenylalkanols, formaldehyde, paraformaldehyde, acetaldehyde, propionaldehyde, butyraldehyde, isobutyraldehyde, valeraldehyde, heptaldehyde, decanal, glyoxal, glutaraldehyde, terephthaldehyde, hexamethylenetetramine, trioxane, tetraoxane, polyoxymethylene, and divinylether are some or the more typical organic crosslinking agents.

Of specific interest with regard to the present invention are so-called "flow-initiated gelling" liquids or emulsions. According to present knowledge, these liquids thicken when subjected to high shear stress and/or a pressure drop across a sudden constriction in the flow path such as the nozzels of a drill bit. The forces cause the emulsion to break down and initiates reactions between molecules from different phases within the emulsion. The fluid must have physical characteristics which enable it to be easily pumped through a drillstring or coiled tubing. The sudden deformation of the fluid induced when the liquid is forced through a sudden constriction at a high pressure drop results in a thickening or gelling of the liquid. It is desirable that the time before thickening is sufficient for the liquid to flow into a predetermined location in the wellbore or into the formation surrounding the wellbore.

When employed as an emulsion, i.e., a composition containing immiscible phases, usually a stabilizing agent or surfactant is added. A surfactant molecule is characterised by containing portions which are strongly attracted to each of the phases present, e.g., in case of a water/oil emulsion, hydrophilic and a hydrophobic portions.

U.S. Pat. No. 4,663,366 discloses an oil-water based liquid of such a nature and an emulsion technique for controlling the thickening of the liquid. According to said patent, a polycarboxylic acid-containing water-in-oil emulsion is used wherein the oil phase contains dispersed therein a hydratable, water-swelling, hydrophilic clay such as bentonite, and additionally contains a solubilized surfactant consisting of a polyamine derivative, and the aqueous phase contains dissolved therein a polyacrylamide and a polycarboxylic acid.

It is critical that the clay be kept separated from the water until the required thickening of the liquid is initiated. For that purpose each droplet of the dispersed aqueous phase is coated with a membrane or a film of a polymeric material which is formed as a consequence or the aqueous phase being dispersed or emulsified in the oil phase of the emulsion. The film or membrane is formed as a result of the interfacial interaction between the polyamine derivative in the oil phase and the polyacrylamide and the polycarboxylic acid in the dispersed aqueous phase.

When the emulsion is subjected to high shear forces, the protective film around the dispersed droplets in the emulsion is broken and the bentonite comes into contact with the water, thus enabling a swelling of the bentonite and consequently a thickening of the liquid.

A similar dual internal phase composition comprising water and clay particles in separated droplets is described in the U.S. Pat. No. 4,397,354.

Another downhole composition with two internal phases is described in the U.S. Pat. No. 4,819,723. The external oil phase includes an aqueous solution of alkali metal silicate and a polyvalent cation in a second phase to provide additional salinity. The emulsion is broken by microwave radiation. Another alkali metal silicate containing microemulsion is described in the U.S. Pat. No. 4,799,549.

Yet another dual internal phase well treatment fluid is described in the British Patent application GB-2022653. Using for example a water-in-oil emulsion dispersed in an aqueous medium, viscosifiers or acids are added to the external phase to provide separation between two ingredients.

Other partly dual internal phase compositions are found in the U.S. Pat. No. 4,891,072, describing the use of such systems as multi-component grouting composition.

A single internal phase composition is described in the British Patent application GB-2008651. The internal phase contains polyacrylamide (PAA), injected into the formation in a process for shutting of water.

In the International Patent Application WO 94/28085, an alternative fluid is disclosed, consisting of an emulsion of a continuous oil phase containing an emulsifier and a crosslinking agent for a polysaccharide and a water discontinuous phase containing a polysaccharide. When this liquid is subjected to sudden deformation the emulsion is broken causing the polysaccharide to crosslink and form a gel which is much stronger than that of U.S. Pat. No. 4,663,366. The particularly preferred system consisted of xanthan as the polymer and calcium hydroxide as the crosslinker. The gel formed by this system remains intact at temperatures below 90° C., above this temperature the gel breaks down.

Though having many advantageous properties, the known emulsion systems are restricted in use. The variety of crosslinking agents which can be used is restricted by the requirement for them to be compatible with the oil chase making it difficult to select a polymer-crosslinker system optimized for a specific application.

It is therefore an object of this invention to provide improved emulsion systems suitable for a broader range of oilfield applications. It is a specific object of the invention to broaden the range of applicable polymers and crosslinking agents for such systems.

SUMMARY OF THE INVENTION

The objects of the invention are achieved by a composition and method as set forth in the appended independent claims.

An important feature of the present invention is pumping an emulsion comprising at least two discontinuous phases containing a crosslinking agent and a polymer in similar or identical solvents while maintaining two phase boundaries to separate both components until the phase boundaries are ruptured though a flow-initiated force. The flow-initiated force is preferably generated by pumping the emulsion through one or more flow restrictions, preferably at a pressure drop in the range of 10 to 50 bar.

A Preferably, the crosslinking agent and the polymer are dissolved in an aqueous solution separated by an hydrophobic phase. The hydrophobic phase can be either continuous or discontinuous. It may advantageously be selected from mineral oils, vegetable oils, esters and ethers. The hydrophobic phase should also contain a suitable surfactant and may be viscosified with and organophillic clay or other additives to enhance the desirable properties of the emulsion produced.

A preferred emulsifier comprises a siloxane or silane based composition as described for example in the UK Patent Application GB-A-2113236 or the International Patent Application WO 96/07710.

In addition to the organic polymers already discussed it is possible to form desirable gels from inorganic compounds such as silicates.

The novel emulsions in accordance with the invention are preferably used for remedial operations in a wellbore or in subterranean formations. However, they may have advantageous use outside the oilfield industry, for example for the building industry.

These and other features of the invention, preferred embodiments and variants thereof, and further advantages of the invention will become appreciated and understood by those skilled in the art from the detailed description and drawings following hereinbelow.

MODE(S) FOR CARRYING OUT THE INVENTION

The figures illustrate important features of the invention in relation to the prior art.

Figure 1:
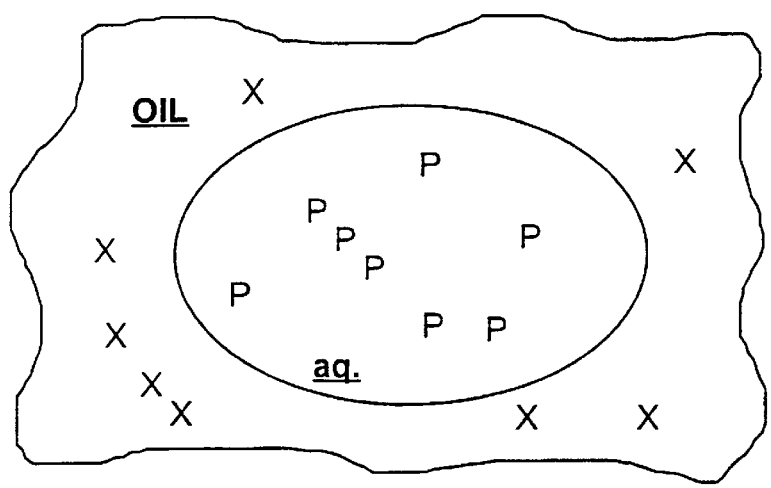
FIG. 1 schematically illustrates a known type of emulsion.

The prior art, as exemplified by the above-mentioned International Patent Application WO 94/28085 and illustrated with reference to FIG. 1, describes a two phase emulsion with a continuous oil phase and a discontinuous water phase. The continuous phase comprises a crosslinking agent (X) and an emulsifier. The aqueous discontinuous phase contains a polymer (P).

Figure 2A:
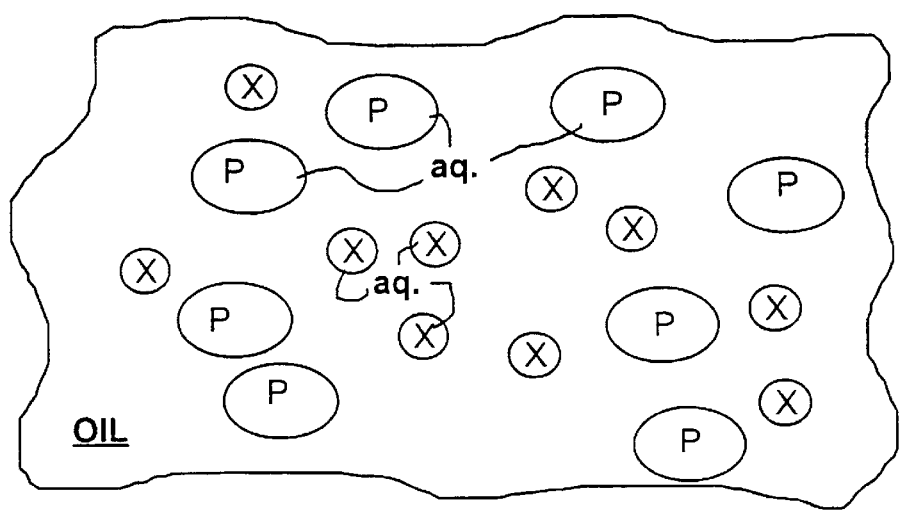
FIGS. 2A–C illustrate examples of an emulsion in accordance with the present invention.
Figure 2B:
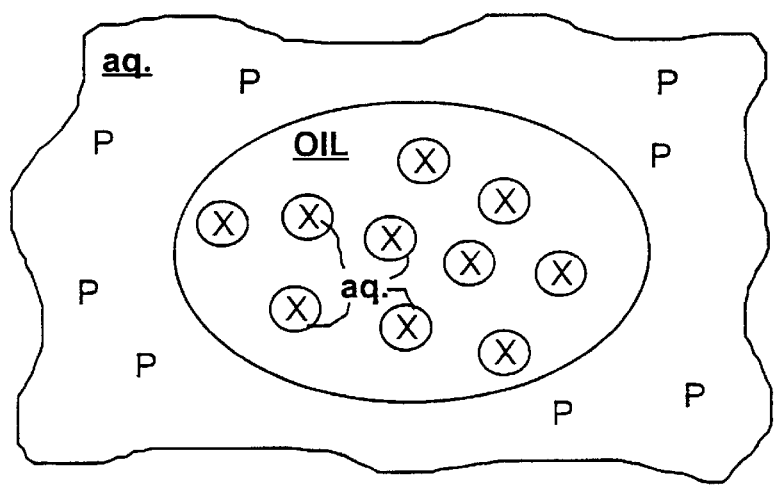
Figure 2C:
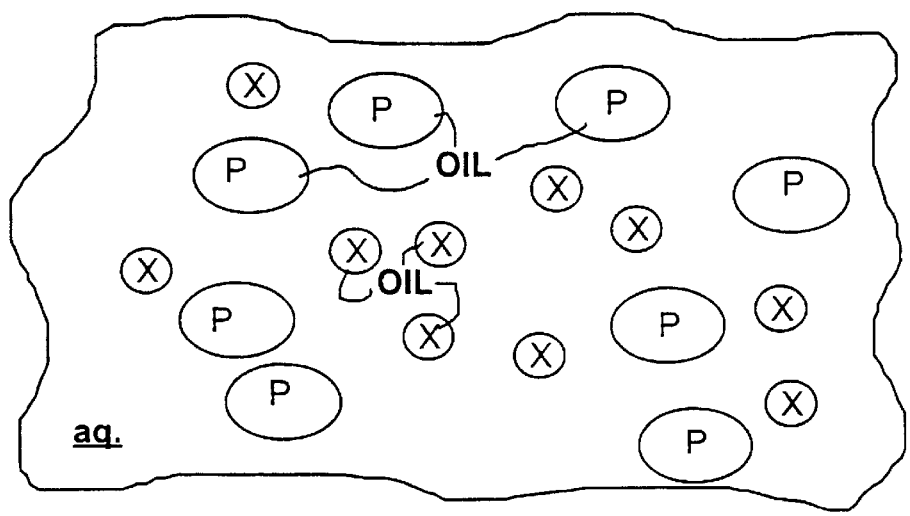

An emulsion according to the invention comprises at least two discontinuous phases. Those could be for example two aqueous phases in an continuous oil phase as in FIG. 2A, an oil phase and an aqueous phase in a continuous aqueous phase as in FIG. 2B or two oil phases in a continuous aqueous phase as in FIG. 2C.

In the following, two sets of examples are given. The first concerns the varieties of emulsion systems while the second gives examples of a small selection of the possible range of crosslinkers which result in gellation.

In all cases a viscosified base oil was used. The base oil was viscosified by adding 40 g/l of IDF TRUVIS, and organophillic clay, and 1 ml/l of water to the base oil. Subsequently the oil was heated to ±60° C. under continuous strong stirring.

To assess the quality of the gels produced their strength was measured using a vane rheometer.

(1) Types of Emulsion System

Two examples of the new emulsion systems are given here using xanthan as the polymer and chromium as the crosslinker. A prehydrated 8 g/l xanthan solution was used for these tests. The results are compared to a crosslinker-in-oil system to demonstrate the advantages of the new systems.

Water in Oil in Water Emulsion System

This system consisted of an emulsion of water-in-oil dispersed in water. Water was the continuous phase and the droplets consisted of an emulsion of water in oil. The continuous water phase contained the polymer and water droplets in the oil droplets contained the crosslinker.

An emulsion consisting of 4 g chromium dissolved in 10 ml water and 250 ml viscosified oil, 1.2 g Interdrill EMUL™ and 0.8 g Interdrill FL™ was prepared under very strong stirring using a paddle mixer for about 2 minutes. Subsequently this mixture was added to a xanthan solution under continuous medium stirring rate for about 2 minutes. Optical microscopy showed that most of the water droplets containing chromium chloride (identified by their green color) were within the oil droplets.

The emulsion had a normal viscosity after mixing, comparable to that of pure xanthan. This mixture appeared to be stable for at least 24 hours. Shearing with a pressure drop of 47 Bar across a valve initiated the crosslinking and the fluid set in about 20–30 minutes. The following strengths were measured for the set material after 1 day: 4.5 kPa, 3.7 kPa and 5.3 kPa. The set material remained gelled at temperatures up to 110° C.

Dual Water in Oil Emulsion System

This system consist of an emulsion of two different water droplets in an oil continuous phase. The major part of the water droplets contains the polymer and a small fraction of the water droplets contains the crosslinker.

An emulsion consisting of 4 g chromium dissolved in 50 ml water together with 250 ml viscosified oil phase, 3.6 g Interdrill EMUL™ and 2.4 g Interdrill FL™ were mixed together under very strong stirring by a paddle mixer for about 2 minutes. Subsequently, xanthan was added to this emulsion over a period of about 5 minutes under continuous medium stirring rate. After mixing in all the xanthan the stirring was continued for another 2 minutes. Optical microscopy confirmed that the oil was the continuous phase of the emulsion.

The emulsion had a normal viscosity after mixing, comparable to pure xanthan (or even lower) and was stable for several days after mixing. Shearing a sample of this fluid with a pressure drop of 35 Bar across a valve initiated the crosslinking and the sheared fluid set in about 30–60 minutes. The following strengths were measured for the set material after 1 day: 3.5 kPa, 4.4 kPa and 4.9 kPa. The set material remained gelled at temperatures up to 110° C.

Crosslinker in Oil System

This system consist of an emulsion of oil in water (continuous chase). In which the water phase contains the polymer, and the oil phase contains the crosslinker.

To make to oil phase, 4 g chromium chloride and 250 ml viscosified base oil, and 1.2 g Interdrill EMUL™ and 0.8 g interdrill FL™ were mixed together and stirred strongly by a paddle mixer for about 2 minutes. Subsequently, this mixture was added to a xanthan gum solution under continuous (medium) stirring rate for about 2 minutes.

The emulsion showed an increased viscosity compared to the pure xanthan solution directly after mixing and was completely set within 1 to 2 hours. Clearly, the chromium chloride leaked out of the oil into the water phase without the need for an intense shear trigger. The following strengths were measured for the set material after 1 day: 2.4 kPa, 2.6 kPa, 2.7 kPa and 2.1 kPa.

(2) Examples of Variations in Crosslinker Chemistry

Water in Oil in Water Emulsion System, Trivalent Vanadium Crosslinker

To prepare the emulsion 8 g vanadium chloride ($VCl_3$) was dissolved in 40 ml water to form the first water phase and 250 ml viscofied oil (base oil +40 gr/l TRUVIS™) containing 1.5 g Interdrill EMUL™ and 1.0 g Interdrill FL™ was prepared as the oil phase. These two fluids were mixed together under very strong stirring by a paddle mixer for about 30 seconds. Subsequently this mixture was added to an 8 g/l xanthan gum solution under continuous medium stirring rate for about 2 minutes.

The emulsion had a normal viscosity after mixing, comparable to pure xanthan. This mixture appeared to be stable for at least 24 hours. Shearing a sample of the fluid with a pressure drop of 20 bar across a valve initiated the crosslinking, and resulted in rapid gellation.

The following yield strengths were measured for a number of samples o the gelled material after 1 day: 1.33 kPa, 1.01 kPa, 1.00 kPa, 0.97 kPa, 0.94 kPa and 0.84 kPa. The maximum temperature stability was determined to be 90° C.

Water in Oil in Water Emulsion System, Aluminum Crosslinker

To prepare the emulsion 10 g aluminum chloride was dissolved in 40 ml water to form the first water phase and 250 ml viscofied oil (base oil +40 g/l TRUVIS™) and 1.5 g Interdrill EMUL™ and 1.0 a Interdrill FL™ was prepared as the oil phase. These two fluids were mixed together under very strong stirring by a paddle mixer for about 30 seconds. Subsequently this mixture was added to a xanthan gum solution (8 gr/l) under continuous medium stirring rate (for about 2 minutes).

The emulsion had a normal viscosity after mixing, comparable to pure xanthan. This mixture appeared to be stable for at least 24 hours. Shearing a sample of the fluid with a pressure drop of 20 bar across a valve initiated the crosslinking, and resulted in rapid gellation.

The following yield strengths were measured for a number of samples of the gelled material after 1 day: 1.17 kPa, 1.07 kPa, 1.00 kPa, 0.98 kPa, 0.88 kPa, 0.87 kPa and 0.61 kPa. The maximum temperature stability was determined to be 90° C.

Water in Oil in Water Emulsion System, Trivalent Iron Crosslinker

To prepare the emulsion 10 g iron nitrate ($Fe(NO_3)_3 \cdot 9H_2O$) was dissolved in 40 ml water to form the first water chase and 250 ml viscofied oil (base oil +40 g/l TRUVIS™) and 1.5 g Interdrill EMUL™ and 1.0 g Interdrill FL™ was prepared as the oil phase. These two fluids were mixed together under very strong stirring by a paddle mixer for about 30 seconds. Subsequently this mixture was added to a xanthan gum solution (8 gr/l) under continuous medium stirring rate (for about 2 minutes).

The emulsion had a normal viscosity after mixing, comparable to pure xanthan. This mixture appeared to be stable for at least 24 hours. Shearing a sample of the fluid with a pressure drop of 17 bar across a valve initiated the crosslinking, and resulted in rapid gellation. Some free water was observed.

The following yield strengths were measured for a number of samples of the gelled material after 1 day: 0.77 kPa, 0.74 kPa, 0.68 kPa, 0.53 kPa, 0.45 kPa. The maximum temperature stability was determined to be 65° C.

(3) Example of Variations in Polymer Chemistry

Water in Oil in Water Emulsion with Polyacrylamide

In this example chromium chloride was dissolved in water to form the first water phase and the pH was subsequently adjusted to 4.0 by addition of sodium hydroxide. The crosslinker solution was then dispersed in an oil phase containing 6.4 wt % (by weight of oil) of a alkyl+polyether modified siloxane emulsifier, Tegopren 7006™ (Th Goldschmidt Ltd), under continuous stirring over around 2 minutes. The primary emulsion 40 formed in this way was then dispersed in a water continuous phase containing 50 g/l polyacrylamide and 3 g/l xanthan during less vigorous stirring.

The emulsion had a normal viscosity after mixing, comparable to the pure polymer phase and was stable for at least a week when static. Shearing a sample of the emulsion with a pressure drop of 20 bar across a valve initiated crosslinking resulting in a strong gel. The gel strength, measured after two hours, was 3.6 kPa.

What is claimed is:

1. An emulsion to be pumped to a subterranean location, comprising a continuous phase, said continuous phase comprising at least two discontinuous phases, said continuous and discontinuous, phases containing polymer and a crosslinking agent separated by at least two phase boundaries.

2. The emulsion of claim 1 having the property of gelling after a flow-initiated process.

3. The emulsion of claim 1 wherein said polymer comprises polyacrylamide.

4. The emulsion of claim 1 wherein said crosslinking agent is chromium based.

5. The emulsion of claim 1 wherein said polymer comprises polyacrylamide and said crosslinking agent is chromium based.

6. The emulsion of claim 1 wherein said emulsion comprises an aqueous solution dispersed in an oil-based solution dispersed in a second aqueous solution.

7. The emulsion of claim 1 further comprising a silane or siloxane based emulsifier.

8. The emulsion of claim 1, wherein one discontinuous phase contains the polymer and the other discontinuous phase contains the crosslinking agent.

9. The emulsion of claim 1, wherein the continuous phase contains the polymer or the crosslinking agent and one discontinuous phase comprises the other discontinuous phase, said other discontinuous phase containing the crosslinking agent or the polymer, respectively.

10. Method of producing a gelling composition in a subterranean formation, comprising the steps of:

preparing an emulsion comprising a continuous phase, said continuous phase comprising at least two discontinuous phases, said continuous and discontinuous phases containing a polymer and a crosslinking agent separated by at least two phase boundaries;

pumping said emulsion into said subterranean formation;

breaking said phase boundaries by a flow-initiated process; and letting the composition gel.

11. The method of claim 10 wherein the said flow-initiate process comprises the step of pumping the composition through one or more flow restrictions.

12. The method of claim 11 using a pressure drop across the said flow restriction in the range of 10 to 50 bar.

* * * * *